(12) United States Patent
Thaler

(10) Patent No.: US 9,054,973 B2
(45) Date of Patent: Jun. 9, 2015

(54) METHOD AND SYSTEM FOR ETHERNET CONGESTION MANAGEMENT

(75) Inventor: Patricia Ann Thaler, Carmichael, CA (US)

(73) Assignee: Broadcom Corporation, Irvine, CA (US)

( * ) Notice: Subject to any disclaimer, the term of this patent is extended or adjusted under 35 U.S.C. 154(b) by 1164 days.

(21) Appl. No.: 12/110,110

(22) Filed: Apr. 25, 2008

(65) Prior Publication Data

US 2008/0267073 A1   Oct. 30, 2008

Related U.S. Application Data

(60) Provisional application No. 60/913,959, filed on Apr. 25, 2007.

(51) Int. Cl.
  *H04L 12/801* (2013.01)
  *H04L 12/26* (2006.01)
  *H04L 12/46* (2006.01)
  *H04L 12/825* (2013.01)
  *H04L 12/841* (2013.01)

(52) U.S. Cl.
  CPC ............ *H04L 47/10* (2013.01); *H04L 12/2697* (2013.01); *H04L 12/4625* (2013.01); *H04L 43/0894* (2013.01); *H04L 43/106* (2013.01); *H04L 43/16* (2013.01); *H04L 43/50* (2013.01); *H04L 47/115* (2013.01); *H04L 47/13* (2013.01); *H04L 47/263* (2013.01); *H04L 47/28* (2013.01); *Y02B 60/31* (2013.01)

(58) Field of Classification Search
  CPC ....... H04L 47/10; H04L 47/22; H04L 47/225; H04L 47/25; H04L 43/50; H04L 47/115; H04L 43/0894; H04L 47/28; H04L 47/13; H04L 12/2697; H04L 47/263; H04L 12/4625; H04L 43/106; H04L 43/16; Y02B 60/31

USPC .............. 370/229, 230, 230.1, 232, 234, 235, 370/235.1, 351, 389, 412, 413, 414

See application file for complete search history.

(56) References Cited

U.S. PATENT DOCUMENTS

| | | | |
|---|---|---|---|
| 5,367,523 A * | 11/1994 | Chang et al. | 370/235 |
| 7,701,851 B2 * | 4/2010 | Chakareski et al. | 370/231 |
| 2002/0165956 A1 * | 11/2002 | Phaal | 709/224 |
| 2005/0144309 A1 * | 6/2005 | Gish | 709/233 |
| 2005/0232151 A1 * | 10/2005 | Chapweske et al. | 370/231 |
| 2006/0120300 A1 * | 6/2006 | Gross | 370/252 |
| 2007/0081454 A1 * | 4/2007 | Bergamasco et al. | 370/229 |
| 2007/0153683 A1 * | 7/2007 | McAlpine | 370/229 |
| 2007/0160050 A1 * | 7/2007 | Wang | 370/392 |

* cited by examiner

*Primary Examiner* — Obaidul Huq
(74) *Attorney, Agent, or Firm* — Oblon, McClelland, Maier & Neustadt, L.L.P.

(57) ABSTRACT

Certain aspects of a method and system for Ethernet congestion management may include transmitting one or more data packets in a network flow from a source node to a destination node. The source node may be enabled to receive one or more congestion notification frames based on detecting congestion at one or more switches in the network flow. A probe packet comprising a departure timestamp, Ts, may be transmitted from the source node to the destination node based on receiving one or more congestion notification frames. The arrival rate, Ra, of one or more data packets at the destination node may be calculated based on an arrival timestamp, Ta, inserted into the probe packet at the destination node. A rate limiter at the source node may be enabled to limit a rate of one or more data packets based on the calculated arrival rate, Ra.

33 Claims, 5 Drawing Sheets

METHOD AND SYSTEM FOR ETHERNET CONGESTION MANAGEMENT

CROSS-REFERENCE TO RELATED APPLICATIONS/INCORPORATION BY REFERENCE

This application makes reference to, claims priority to, and claims benefit of U.S. Provisional Application Ser. No. 60/913,959, filed Apr. 25, 2007.

The above stated application is hereby incorporated herein by reference in its entirety.

FEDERALLY SPONSORED RESEARCH OR DEVELOPMENT

Not Applicable

MICROFICHE/COPYRIGHT REFERENCE

Not Applicable

FIELD OF THE INVENTION

Certain embodiments of the invention relate to communication networks. More specifically, certain embodiments of the invention relate to a method and system for Ethernet congestion management.

BACKGROUND OF THE INVENTION

Innovations in data communications technology, fueled by bandwidth-intensive applications, have led to a ten-fold improvement in networking hardware throughput occurring about every four years. These network performance improvements, which have increased from 10 Megabits per second (Mbps) to 100 Mbps, and now to 1-Gigabit per second (Gbps) and 10-Gbps, have outpaced the capability of central processing units (CPUs). To compensate for this dilemma and to free up CPU resources to handle general computing tasks, offloading Transmission Control Protocol/Internet Protocol (TCP/IP) functionality to dedicated network processing hardware is a fundamental improvement. TCP/IP chimney offload maximizes utilization of host CPU resources for application workloads, for example, on Gigabit and multi-Gigabit networks.

Converged network interface devices are generally utilized to integrate a plurality of different types of network traffic into one physical network. Although there may be instances when the quality of service (QoS) requirements for the different types of traffic are consistent, it is often the case that these QoS requirements are inconsistent with each other. Management traffic, for example, may require guaranteed delivery regardless of traffic conditions. Converged network interface devices may perform protocol acceleration and protocol processing beyond OSI layer 2 and may require considerable computational power. Certain types of traffic such as clustering traffic may require low latency. Storage traffic, for example, may require efficient guaranteed delivery with varying bursty traffic loads. Some types of traffic such as critical networking traffic may require varying levels of prioritization, while other networking traffic may require best effort.

Clustering traffic may use proprietary or standardized clustering technologies. Storage traffic may use fiber channel, for example, while networking traffic may use Ethernet. In many cases, management traffic may utilize a separate out of band management network to guarantee delivery and avoid mixing it with the user Ethernet network. Each of these separate networks may be specifically designed to guarantee the quality of service required for the payload it carries so that there are no other traffic types with conflicting QoS requirements trying to share the same network. When consolidating all these networks over a single network that carries all traffic types, the converged network may provide similar QoS as guaranteed by the physically separate networks.

Congestion avoidance is an algorithm that may be utilized, for example, by TCP based traffic in conjunction with slow start to minimize the effects of lost packets. Congestion may occur when a device may receive more TCP segments at its input than it may be able to adequately process with some minimal acceptable delay. Congestion may also occur when TCP segments transition from a faster transport infrastructure to a slower transport infrastructure. In this regard, the network device at the edge of the faster transport infrastructure and the slower transport infrastructure may become a bottleneck. Congestion may also occur in the infrastructure when traffic from multiple sources converges on a link that can not carry the aggregated load.

Memory bandwidth has not scaled at the same pace as network bandwidth, and as a result, networking devices with external memory are difficult and expensive to build. The buffer memories embedded within the networking device may have the required memory bandwidth to buffer networking traffic, but since the buffer memory has to be internal to the device, whether a switching device or a network interface device, its size is usually considerably smaller than external memory, traditionally used for lower speed devices.

Buffer memory in packet networks typically needs to compensate for the round trip time of the network along with some control loop elements, typically in both ends but also in the infrastructure. Aggravating the problems even further may be the trend of shifting from external to internal memories, as it may reduce the available buffer space. This severe reduction in buffer space may severely impact the TCP flow control, the clear predominant protocol that is used for the vast majority of network traffic and potentially other application level flow controls or any other measures used. Some storage and interprocessor communication traffic may not use TCP. Such traffic may use networks with link flow control operating below the transport layer, for example, Infiniband or Fibre Channel. The addition of congestion management to Ethernet may enable Ethernet to carry such traffic.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for Ethernet congestion management, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a system and/or method for Ethernet congestion management. Exemplary aspects of the invention may comprise transmitting one or more data packets in a network flow from a source node to a destination node. The source node may be enabled to receive one or more congestion notification frames based on detecting congestion at one or more switches in the network flow. A probe packet comprising a departure timestamp, Ts, may be transmitted from the source node to the destination node based on receiving one or more congestion notification frames. The arrival rate, Ra, of one or more data packets at the destination node may be calculated based on an arrival timestamp, Ta, inserted into the probe packet at the destination node. A rate limiter at the source node may be enabled to limit a rate of one or more data packets based on the calculated arrival rate, Ra.

Figure 1:
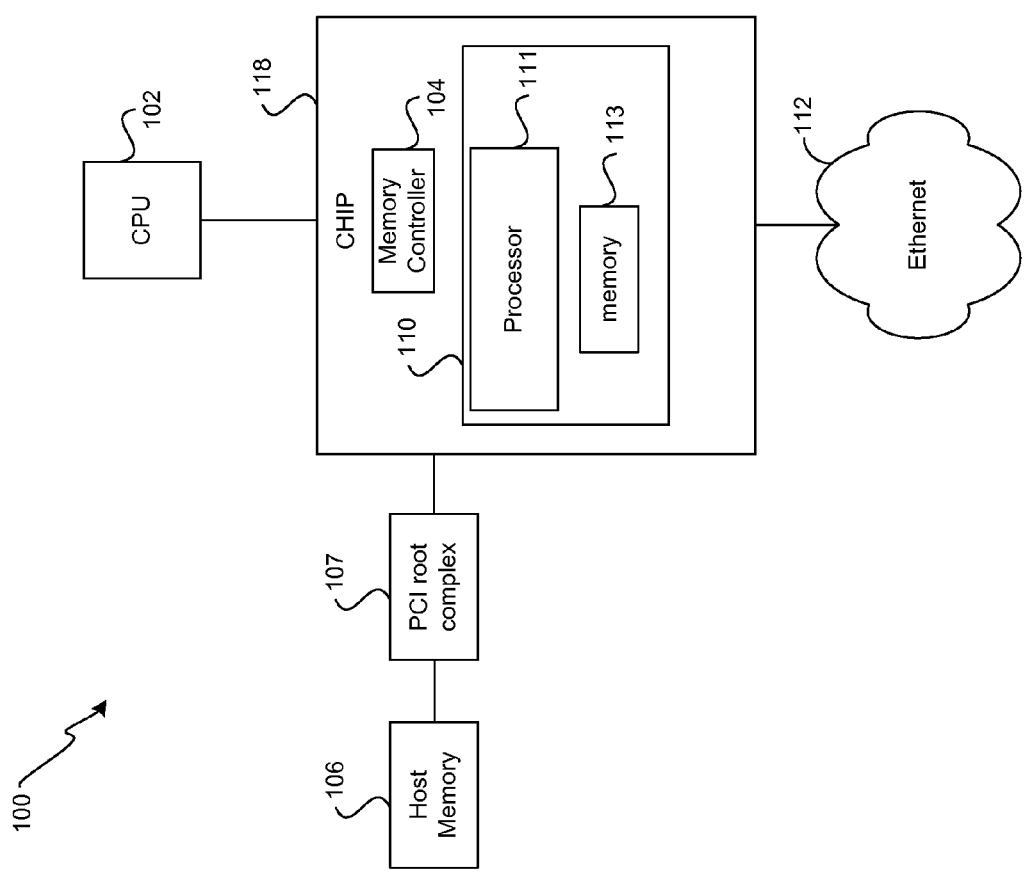
FIG. 1 is a block diagram of an exemplary system that may be utilized for Ethernet congestion management for converged network interface devices, in accordance with an embodiment of the invention.

FIG. 1 is a block diagram of an exemplary system that may be utilized for Ethernet congestion management for converged network interface devices, in accordance with an embodiment of the invention. Referring to FIG. 1, there is shown a node 100. The node may be a source node, a destination node, or any other intermediate node, for example. The node 100 may comprise a CPU 102, a host memory 106, PCI root complex 107 and a chip 118. The chip 118 may comprise, for example, the network subsystem 110 and the memory controller 104. The chip 118 may be coupled to the CPU 102 and to the host memory 106 via the PCI root complex 107. The PCI root complex 107 may enable the chip 118 to be coupled to PCI buses and/or devices, one or more processors, and memory, for example, host memory 106. Notwithstanding, the host memory 106 may be directly coupled to the chip 118. In this case, the host interface 108 may implement the PCI root complex functionally and may be coupled to PCI buses and/or devices, one or more processors, and memory. The network subsystem 110 of the chip 118 may be coupled to the Ethernet 112. The network subsystem 110 may communicate to the Ethernet 112 via a wired and/or a wireless connection, for example. The wireless connection may be a wireless local area network (WLAN) connection as supported by the IEEE 802.11 standards, for example. The network subsystem 110 may also comprise, for example, an on-chip memory 113.

The network subsystem 110 may comprise a processor 111. The processor 111 may be enabled to transmit one or more data packets to a destination node via one or more switches. The processor 111 may also be enabled to transmit probe packets comprising timestamps to the destination node. Although illustrated, for example, as a CPU and an Ethernet, the present invention need not be so limited to such examples and may employ, for example, any type of processor and any type of data link layer or physical media, respectively. In another embodiment of the invention, the chip 118 may be a MAC chip and the CPU 102 may be enabled to handle a plurality of networking protocols. The processor 111 may be a separate integrated chip from the chip 118, embedded on a motherboard or may be embedded in a NIC.

Figure 2A:
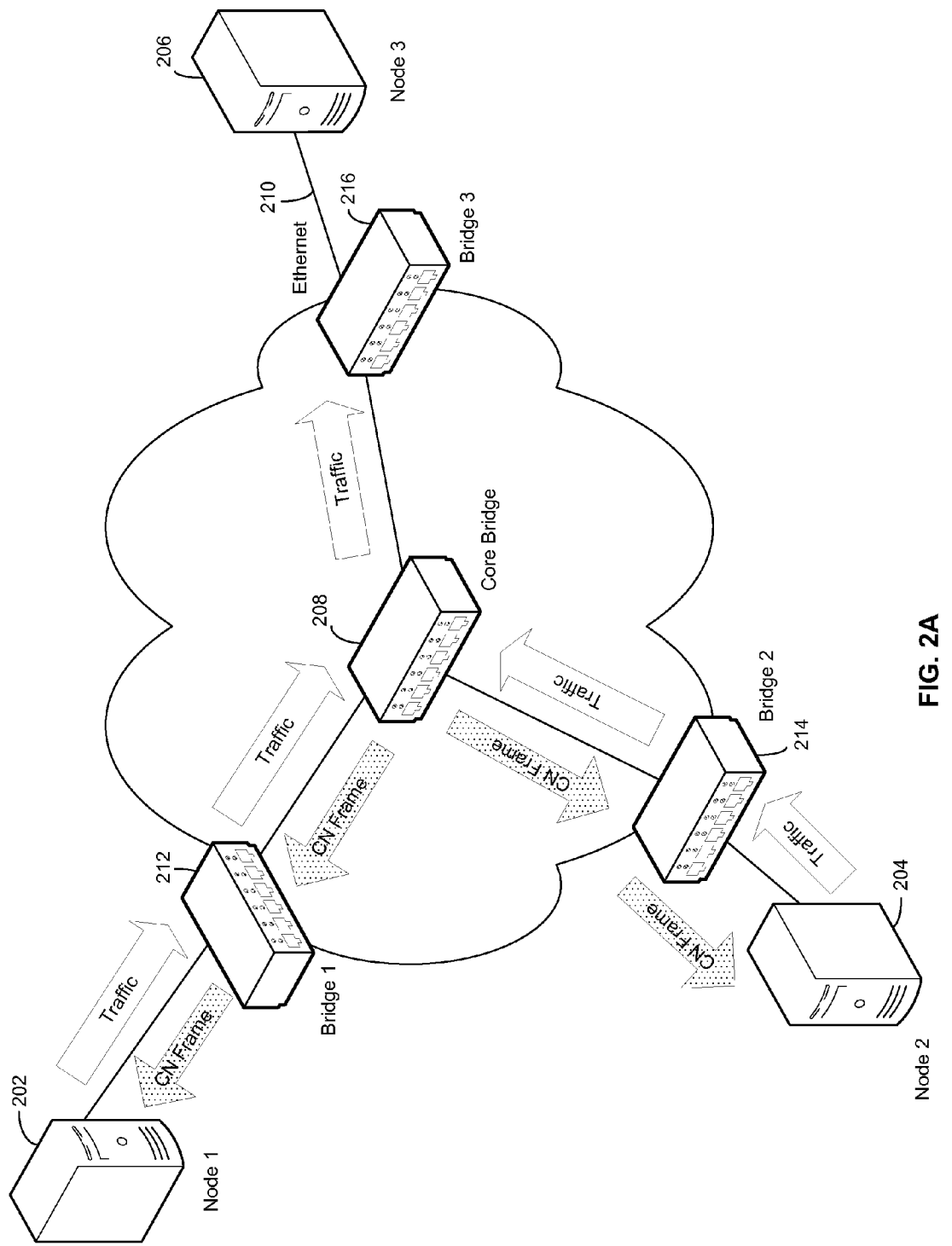
FIG. 2A is a block diagram of an exemplary system illustrating a congestion notification (CN) mechanism, in accordance with an embodiment of the invention.

FIG. 2A is a block diagram of an exemplary system illustrating a congestion notification (CN) mechanism, in accordance with an embodiment of the invention. Referring to FIG. 2A, there is shown a plurality of nodes, such as, node 1 202, node 2 204 and node 206, a plurality of bridges, such as, bridge 1 212, bridge 2 214, bridge 3 216, and a core bridge 208.

The plurality of nodes, for example, node 1 202, node 2 204 and node 3 206 may comprise one or more of computers, personal digital assistants (PDAs), cell phones, switches, routers, work stations, servers and/or various other networked devices.

The plurality of bridges, for example, bridge 1 212, bridge 2 214, bridge 3 216, and the core bridge 208 may comprise suitable logic, circuitry, and/or code that may be enabled to couple multiple network segments at the data link layer (layer 2) of the OSI model, for example. In accordance with an embodiment of the invention, the term "layer 2 switch" may be used interchangeably with the term "bridge" without limiting the scope of the invention. The plurality of bridges 208, 212, 214 and 216 may be enabled to bridge network traffic from one node to another node via the Ethernet link 210. For example, bridge 1 212, core bridge 208 and bridge 3 216 may be enabled to bridge network traffic between nodes 202 and 206 via the Ethernet link 210. Similarly, bridge 2 214, core bridge 208 and bridge 3 216 may be enabled to bridge network traffic between nodes 204 and 206 via the Ethernet link 210.

In operation, when the core bridge 208 detects that the network traffic between various nodes is above a particular threshold value, the core bridge 208 may be enabled to generate one or more congestion notification (CN) frames to one or more nodes, for example, nodes 202 and 204 transmitting network traffic via the core bridge 208 based on one or more parameters, for example, the presence of rate-limited tag (RLT) tags, flow equilibrium of the queue (Qeq), frame sampling, and/or severe congestion of the queue (Qsc). The one or more nodes, for example, nodes 202 and 204 receiving the CN frames from the core bridge 208 may be enabled to adjust the rate of transmitting data frames to node 3 206 via the core bridge 208 based on the received CN frames. The transmitting nodes, node 1 202 and node 2 204 may comprise a rate limiter that may utilize one or more exemplary algorithms, such as an additive increase multiplicative decrease (AIMD) algorithm to adjust the rate of transmitting data frames to the core bridge 208.

Figure 2B:
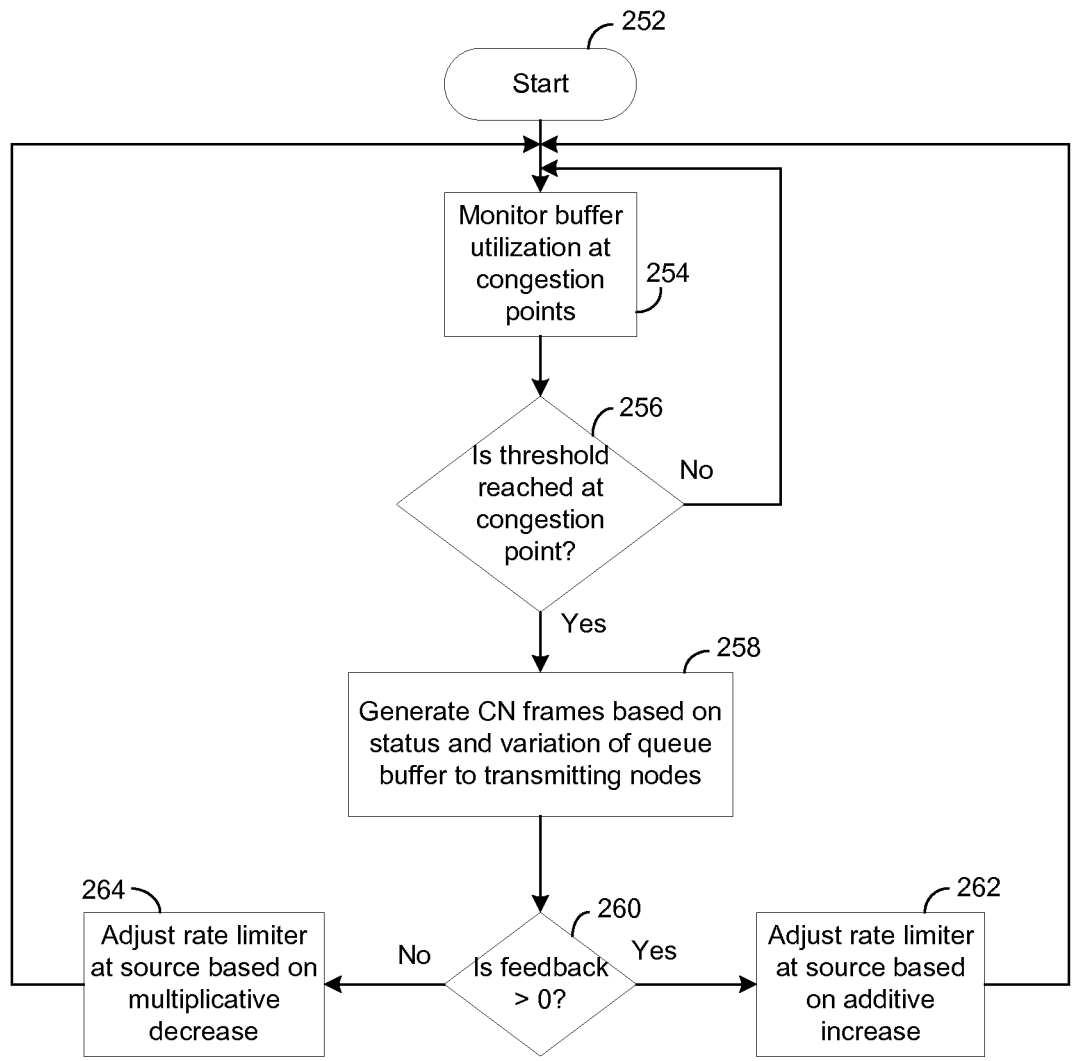
FIG. 2B is a flowchart illustrating exemplary steps for operation of a congestion notification (CN) mechanism, in accordance with an embodiment of the invention.

FIG. 2B is a flowchart illustrating exemplary steps for operation of a congestion notification (CN) mechanism, in accordance with an embodiment of the invention. Referring to FIG. 2B, exemplary steps may begin at step 252. In step 254, the core bridge 208 may be enabled to monitor the buffer utilization at one or more potential congestion points in the core bridge 208 based on sampling the incoming network traffic. In accordance with an embodiment of the invention, each congestion point may have a unique congestion point identification number (CPID), for example. In step 256, it may be determined whether the incoming network traffic exceeds one or more congestion points in the core bridge 208. If the incoming network traffic does not exceed one or more congestion points in the core bridge 208, control returns to step 254.

If the incoming network traffic exceeds one or more congestion points in the core bridge 208, control passes to step 258. In step 258, one or more CN frames comprising the feedback may be generated based on the status and variation of the queue buffer to the one or more transmitting nodes. The variation of the queue buffer may depend on two parameters, for example, queue offset (Qoff) and incremental variation in the queue (Qdelta). For example, the queue may be sampled randomly with probability Pm. The parameters, Qoff and Qdelta may be determined based on the following equations:

$$Q\text{off}=\min\{Q\text{eq},Q\text{eq}-Q\text{len}\},\text{range}[-Q\text{eq},+Q\text{eq}] \quad (1)$$

$$Q\text{delta}=\max\{\min\{2Q\text{eq},\#\text{pktArrival}-\#\text{pktDeparture}\},-2Q\text{eq}\},\text{range}[-2Q\text{eq},+2Q\text{eq}] \quad (2)$$

where Qlen is the length of the queue, #pktArrival is the number of packets arrived at the queue and #pktDeparture is the number of packets departed from the queue. The feedback Fb may be calculated based on the following equation:

$$Fb=(Q\text{off}-W\times Q\text{delta}) \quad (3)$$

where W is a suitably chosen derivative weight.

In step 260, it may be determined whether the feedback is greater than 0 ("zero"). If the feedback is greater than zero, control passes to step 262. In step 262, the rate limiter at the source or the one or more transmitting nodes may be enabled to adjust the transmitting rate of network packets based on the following equation:

$$R=R+(Gi\times Fb\times Ru) \quad (4)$$

where R is the source rate or rate of transmission of network packets at one or more nodes, Gi is the additive increase gain, and Ru is a suitably chosen rate unit. Control then returns to step 254.

If the feedback is less than zero, control passes to step 264. In step 264, the rate limiter at the source or the one or more transmitting nodes may be enabled to adjust the transmitting rate of network packets based on the following equation:

$$R=\text{Min}\{0,R\times(1-Gd\times|Fb|)\} \quad (5)$$

where Gd is the multiplicative decrease gain. Control then returns to step 254.

Figure 3A:
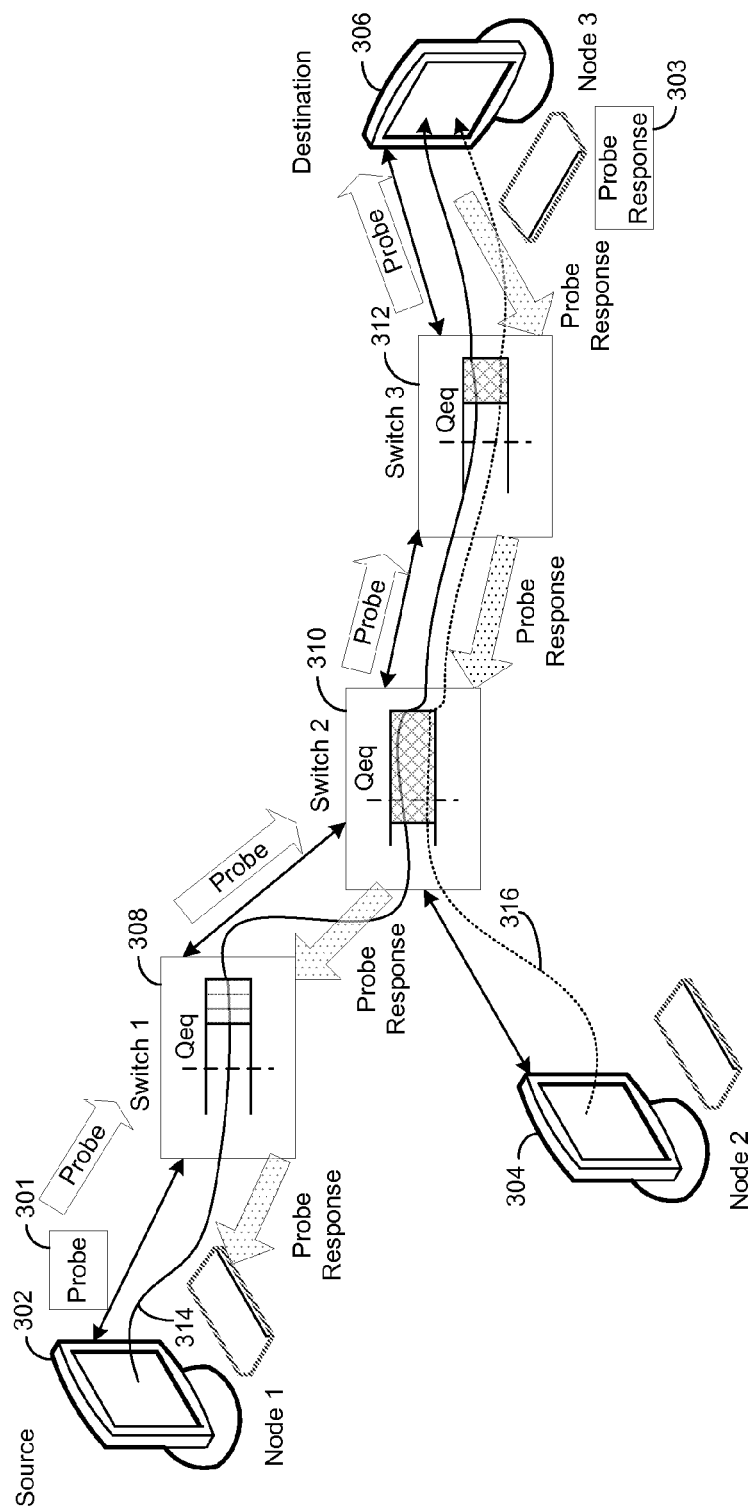
FIG. 3A is a block diagram of an exemplary system illustrating an Ethernet congestion management probe mechanism for network interface devices, in accordance with an embodiment of the invention.

FIG. 3A is a block diagram of an exemplary system illustrating an Ethernet congestion management probe mechanism for network interface devices, in accordance with an embodiment of the invention. Referring to FIG. 3A, there is shown a plurality of nodes, such as, source node, node 1 302, destination node, node 3 306 and an intermediate node, node 2 304, a plurality of switches, switch 1 308, switch 2 310 and switch 3 312.

The plurality of nodes, for example, node 1 302, node 2 304 and node 3 306 may comprise one or more of computers, personal digital assistants (PDAs), cell phones, switches, routers, work stations, servers and/or various other networked devices.

The plurality of switches, for example, switch 1 308, switch 2 310 and switch 3 312 may comprise suitable logic, circuitry, and/or code that may be enabled to couple multiple network segments at the data link layer (layer 2) of the OSI model, for example. In accordance with an embodiment of the invention, the term layer 2 "switch" may be used interchangeably with the term "bridge" without limiting the scope of the invention. The plurality of switches 308, 310 and 312 may be enabled to bridge network traffic from one node to another node via an Ethernet link, for example. For example, switch 1 308, switch 2 310 and switch 3 312 may be enabled to bridge network traffic between the source node, node 1 302 and the destination node, node 3 306. Similarly, switch 2 310 and switch 3 312 may be enabled to bridge network traffic between node 2 304 and node 3 306 via the Ethernet link. Each of the plurality of switches, switch 1 308, switch 2 310 and switch 3 312 may be enabled to monitor the buffer utilization at one or more potential congestion points in the switches based on sampling the incoming network traffic. In accordance with an embodiment of the invention, each congestion point may have a unique congestion point identification number (CPID), for example.

In operation, nodes 302 and 304 may be enabled to communicate network packets to the destination node, node 3 306 via the plurality of switches, switch 1 308, switch 2 310 and switch 3 312. When one of the switches, for example, the switch 310 detects that the network traffic between various nodes, for example, between source node, node 1 302 and destination node, node 3 306 may be above a particular threshold value, Qeq, the switch 310 may be enabled to generate one or more congestion notification (CN) frames. The congestion notification (CN) frames may be communicated to the source node, node 1 302 based on one or more exemplary parameters comprising a presence of rate-limited tag (RLT) tags, Qeq, frame sampling, and/or severe congestion of the queue (Qsc). Notwithstanding, the source node, node 1 302 may be enabled to receive the CN frames from the switch 310. The rate limiter in the source node, node 1 302 may be enabled to adjust the rate of transmitting data frames to the destination node, node 3 206 via the switch 310 based on the received CN frames. The source node, node 1 302 may be enabled to transmit a probe packet 301 with a departure timestamp (Ts) to the destination node, node 3 306. In accordance with an embodiment of the invention, the probe packet 301 may be transmitted in response to a received CN frame from the switch 310.

In accordance with another embodiment of the invention, the probe packet 301 may be transmitted only in rate limited flows in the network. For example, a probe packet 301 may be transmitted for every X KB of data sent per flow, where X=75 KB, for example. Notwithstanding, the invention may not be so limited, and other values of X may be utilized without limiting the scope of the invention. The probe packet 301 may traverse the network in-band in order to observe the real time current queuing delay. Furthermore, the probe packet 301 may be transmitted per-flow at the source node, node 1 302 as a particular queue may comprise more than one flow.

In accordance with an embodiment of the invention, the source node, node 1 302 may be enabled to periodically transmit probe packets 301 for each rate limited tag (TLT) flow. When the probe packet 301 arrives at the destination node, node 3 306, the destination node, node 3 306 may be enabled to update the timestamp Ts of the probe packet 301 to reflect the forward latency L of the flow. The flow service rate (Rflow) since the arrival of the last probe packet 301 may be calculated and inserted into the probe packet 301. The destination node, node 3 306 may transmit a probe response packet 303 with the updated time stamp to the sending source node, node 1 302. When the probe response packet 303 arrives at the source node, node 1 302, the latency L may be adjusted for flight time $L_0$. The mean number of bytes of probed flow stored on entire forward path (Q) may be calculated using Little's formula:

$$Q=(L-L_0)*R\text{flow} \quad (6)$$

The extended CN source response function may be applied to compute the path occupancy of the queue. One or more rate limiting algorithms, such as the AIMD control algorithm may be applied using the rate limiter at the source node, node 1 302.

In accordance with an embodiment of the invention, the Ethernet congestion management scheme may be enabled to extend buffer occupancy per path and flow. The triggering of the CN frames may be performed on a rate based threshold and/or a size based threshold, for example.

In accordance with an embodiment of the invention, the Ethernet congestion management scheme may be implemented based on the following exemplary pseudo code:

```
If (cn.type ( ) == CN_PROBE) {
// Store minimum latency as time of flight
        If (flightTime > cn.getLatency ( ) || flightTime == 0.0)
                flightTime = cn.getLatency ( );
// Compute amount of data queued on forward path, adjusting for flight time
        flowQ = cn.getThroughput ( ) * (cn.getLatency ( ) – flightTime);   // Calculate
number of packets per flow stored in buffers throughout the network
        flowdQ = max (min ( flowQ – flowLastQ, 2*flowQeq), –2*flowQeq); // Calculate
number of packets queued since last sampling of the network
        flowQoff = max (min (flowQeq – flowQ, flowQeq), –flowQeq); // Calculate flow
offsets from equilibrium of queue
if (flowQ > flowQmax) // Qmax threshold exceeded?
        feedback (Fb) = – (1 + 2*W) * flowQeq; // Apply maximum negative feedback (7)
else
        Fb = (flowQoff – W*flowdA); // Compute feedback                        (8)
flowLastQ = flowQ; // Store last queue estimate
// Apply AIMD rate adjustment
if (Fb > 0) // additive increase
        R = R + (Gi × Fb × Ru);                                (9)
if (Fb < 0) // multiplicative decrease
        R = R × (1 + Gd × Fb);}                                (10)
```

In accordance with an embodiment of the invention, the Ethernet congestion management scheme or protocol may be enabled to solve various issues relating to the current congestion notification mechanisms, for example, a delayed start of full operation due to a lack of an initial minimum latency estimate. The rate measurement may be inaccurate due to variation in time to return the probe packet 301. With regard to robustness of the protocol, probe packets may be lost or may be reordered as may happen when changes occur in the path through the network. When no congestion is detected, the rate limit may be allowed to increase, regardless of whether the decrease in congestion is due to the source node, node 1 302 not using its full rate limit or due to an increase in network capacity. The congestion notification mechanism may require multiple round trips to reduce the send rate adequately.

In accordance with various embodiments of the invention, uncongested links may be occasionally probed, or probe packets 301 may be injected into uncongested links in order to learn and store the flight time or a default initial estimate of flight time. Positive feedback may be ignored for a duration long enough for the CN frame feedback to slow any initial congestion, at which time the actual flight time may be determined. In accordance with another embodiment of the invention, to remove variability in the duration of probe packet 301 return time, the destination node, node 3 306 may insert a timestamp Ta in the probe packet 301. The source node, node 1, 302 may be enabled to compare the arrival timestamp Ta with the prior timestamp from the destination node, node 3 306. In this regard, no synchronization between the source node, node 1 302 and the destination node, node 3 306 clocks may be needed. A byte count or sequence ID may be utilized in the probe packet 301, which may allow the protocol to be robust for dropped or misordered probe packets 301.

In accordance with an embodiment of the invention, the amount at which the rate limit may increase above the actual transmit rate may be limited. This may, for example, prevent an increase in rate limit beyond the probe packet tested capacity of the path. Similarly, a mechanism for ending rate limiting of a flow may be provided.

The Ethernet congestion management scheme or protocol may be enabled to solve various issues relating to the current congestion notification mechanisms, for example, there may be no initial knowledge of minimum latency and after probing, or inserting a probe packet 301, the latency may be set to a minimum latency since the start of probing. Accordingly, until the initial burst of congestion has been resolved by CN frame feedback, latency L may be equal to the flight time $L_0$ and Little's formula may yield flowQ=0. As a result, flowdQ may be equal to zero and flowQoff=flowQeq yielding positive feedback. Positive feedbacks may be ignored for a certain time period following the initialization of a rate limiter.

The source node, node 1 302 may be enabled to support a per destination node feedback. For example, a probe packet 301 may be inserted initially to the destination node, node 3 306 to establish an initial flightTime estimate instead of waiting for a CN frame feedback from the switch 2 310. A parameter may be utilized for initializing flight time or the estimated maximum flight time in the network.

The receiver or destination node, node 3 306 may insert an arrival timestamp (Ta) in each received probe packet 301 from the source node, node 1 302. The source node, node 1 302 may be enabled to store the Ta of the last received probe packet 301 from the destination node, node 3 306. The source node, node 1 302 may be enabled to calculate the source rate based on the difference between the two timestamps, when the next probe packet 301 arrives at the source node, node 1 302. Accordingly, the variation in the source rate calculation may be prevented by avoiding the use of a clock sync as the source node, node 1 302 may be using two timestamps from the same device.

The source node, node 1 302 may insert a parameter B in the probe packet 301 that indicates the number of total bytes sent in the flow. The parameter B may be stored in a rollover counter large enough to not rollover between several transmitted probe packets 301, for example. In an exemplary embodiment of the invention, the rollover counter may be 24 or 32 received bits. Notwithstanding, the invention may not be so limited and other values may be utilized without limiting the scope of the invention.

The source node, node 1 302 may be enabled to store the arrival timestamp Ta and the number of total bytes sent in the flow up to the insertion of the probe packet 301 (B) from the last received probe packet 301. The destination node, node 3

306 may be enabled to calculate the arrival rate Ra when a new probe packet 301 arrives at the destination node, node 3 306, even if probe packets 301 were lost according to the following equation:

$$Ra=(B_{new}-B_{old})/(Ta_{new}-Ta_{old}) \quad (11)$$

where $B_{new}$ is the number of bytes of the one or more data packets transmitted in the network flow since arrival of a previous probe packet, $B_{old}$ is the number of bytes of one or more data packets transmitted in the network flow up to the transmission of one or more probe packets 301, $Ta_{new}$ is the arrival timestamp of the transmitted one or more probe packets 301 and $Ta_{old}$ is the arrival timestamp of the previous probe packet.

The subtractions may be performed with normal rollover counter math or in sequence counter math, for example. If Ra<0, there may have been misordering in the network or possible path change. In that case, the calculation and the saved values may be discarded. The next calculation of Ra may occur when two probe packets 301 have arrived in the correct sequence.

In another embodiment of the invention, the source node, node 1 302 may not need to keep track of the parameter B, if the source node, node 1 302 sends a certain amount of throughput (Tput) between probe packets 301. Each probe packet 301 may comprise a sequence ID inserted at the source node, node 1 302. The source node, node 1 302 may be enabled to store the sequence ID and the arrival timestamp, Ta from the last received probe packet 301. The arrival rate Ra may be calculated according to the following equation:

$$Ra=(Tput \times SID_{diff})/(Ta_{new}-Ta_{old}) \quad (12)$$

where Tput is equal to a throughput of transmitting one or more data packets at the source node, node 1 302 between the previous probe packet and the transmitted one or more probe packets 301, and $SID_{diff}$ is a difference in sequence identification (SID) of the previous probe packet and SID of the transmitted one or more probe packets 301. To reduce the number of calculations the value of ($Tput \times SID_{diff}$) may be calculated based on a look up table for values of 1 to 4 in difference, for example. However, the probe packet 301 may be of a minimum packet size and there may be a variation in the amount of data between probe packets 301 up to a maximum packet size.

In accordance with another embodiment of the invention, the Ethernet congestion management scheme or protocol may be enabled to solve various issues relating to the current rate control algorithms, for example, when multiple feedback cycles may be required that may reduce the output rate. The maximum feedback may reduce the source rate by one half, for example. When a plurality of flows contribute to congestion, for example, 100 flows, each of the flows may need multiple feedbacks to reduce the sending rates and the rate of receiving feedback may be reduced by the number of nodes since the congestion point may only send feedback to one source node per sample period. The rate limit R in the source node, node 1 302 may be adjusted faster based on received rate feedback from the destination node, node 3 306. If there is congestion, the arrival rate Ra at the destination node, node 3 306 may be less than the sending rate (Rs) at the source node, node 1 302.

The source node, node 1 302 may be enabled to insert the timestamp Ts in each probe packet 301. The source node, node 1 302 may be enabled to store Ts from the last received probe response packet 303. The source node, node 1 302 may be enabled to calculate the sending rate Rs between two probe packets 301 according to the following equation:

$$Rs=(B_{new}-B_{old})/(Ts_{new}-Ts_{old}) \quad (13)$$

where $Ts_{new}$ is the departure timestamp of the transmitted one or more probe packets 301 and $Ts_{old}$ is the departure timestamp of the previous probe packet. The feedback may be calculated according to equations (7) and (8). According to the following relationship:
if (Feedback<0)//multiplicative decrease $$R=R \times (1+Gd \times Fb) \quad (10)$$

In accordance with an embodiment of the invention, if the feedback is negative, the rate limit R in the source node, node 1 302 may be calculated according to the following equation:

$$R=\min\{(R \times (1+Gd \times Fb)), Ra\} \quad (14)$$

where Ra may be calculated according to equations (11) or (12). In accordance with another embodiment of the invention, the rate limit R in the source node, node 1 302 may be calculated according to the following equation:

$$R=\min\{(R \times (1+Gd \times Fb)), (Ra-drain)\} \quad (15)$$

where drain may be a suitably chosen delta value to ensure that Rs<Ra to allow the queues to start draining.

In accordance with another embodiment of the invention, the Ethernet congestion management scheme or protocol may be operable to solve various issues relating to the current rate control algorithms, for example, increase in the rate limit when queue size is reduced regardless of actual send rate. The network may assume that the source node, node 1 302 is sending at its rate limit even if the sending rate Rs is bursty. A reduction in queue size may reflect a reduction in send rate Rs rather than an increased flow capacity in the path. When a relatively idle period starts, the queues may drain and the source node, node 1 302 may receive an increased number of feedback signals. The increased number of feedback signals may allow the rate to increase even though the capacity of the path may not have been tested by the source flow. According to the following relationship:
if (Feedback>0)//additive increase $$R=R+(Gi \times Fb \times Ru) \quad (9)$$

In accordance with an embodiment of the invention, if the feedback is positive, the rate limit (R) in the source node, node 1 302 may be calculated according to the following equation:

$$R=\max\{R, (Rs \times (1+Gd \times Fb))\} \quad (16)$$

where Rs may be calculated according to equation (13). If the sum of the sending rate Rs and the calculated additive increase is less than the current rate limit, then the current rate limit may be utilized.

In accordance with another embodiment of the invention, the Ethernet congestion management scheme or protocol may be enabled to solve various issues relating to the current rate control algorithms, for example, controlling occupancy of the aggregate switch buffers along the link path. The congestion may not uniformly use the buffers of the switches in the path. If there is no pause like capability, only the buffers at the congestion point may be occupied. If there is a pause like capability, the buffer usage may be distributed across switches from the source node, node 1 302 to the congestion point but the buffers after the congestion point may not be in use. The buffer usage may be controlled to a queue equilibrium based on path capacity without overflowing the equilibrium amount of a single switch when buffer usage is not equally distributed.

If Rs>Ra, the number of packets being transmitted from the source node, node 1 302 is greater than the path capacity of the queue. The sending rate Rs may then be reduced to a value that is less than Ra. The arrival rate Ra may need to be reduced because various buffers that may be filled may have to be drained. The rate limit R may be calculated according to the following equation:

$$R=Ra-(Rs-Ra)=2*Ra-Rs \qquad (17)$$

If Rs<=Ra, the number of packets being transmitted from the source node, node 1 302 is less than or equal to the path capacity of the queue or some of the buffers in the queue may have drained. The sending rate Rs may then be increased to determine if the sending rate Rs matches the path capacity of the queue. The rate limit R may be calculated according to the following equation:

$$R=\max(R,Rs\times A) \qquad (18)$$

where the multiplicative increase A>1.

In accordance with another embodiment of the invention, the maximum rate limit R may not increase to be equal to the path capacity of the queue or full link rate. In one embodiment of the invention, when an additive increase is utilized, rate limiting may be terminated when rate limit R has not been decreased in the last N sample periods, where N is a suitably chosen numerical value. If Rs>Ra, the control loop may cycle between decreasing sending rate Rs to a value below arrival rate Ra, and then gradually increasing the sending rate Rs until it is greater than the link capacity, and continuing until equilibrium is reached. The rate limiting may be terminated when Rs<Ra for N sample periods.

Figure 3B:
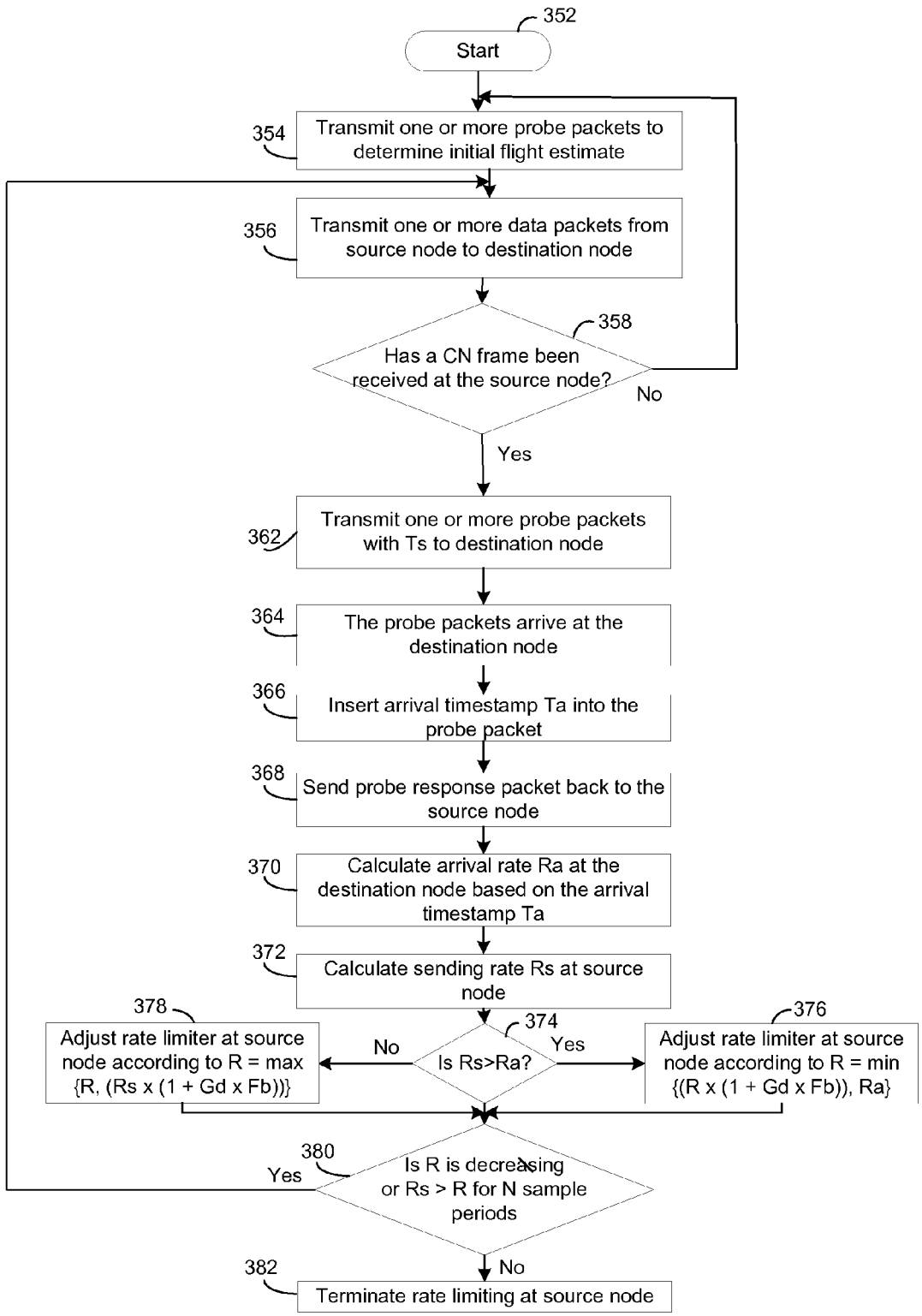
FIG. 3B is a flowchart illustrating exemplary steps for operation of the Ethernet congestion management mechanism for network interface devices, in accordance with an embodiment of the invention.

FIG. 3B is a flowchart illustrating exemplary steps for operation of the Ethernet congestion management mechanism for network interface devices, in accordance with an embodiment of the invention. Referring to FIG. 3B, exemplary steps may begin at step 352. In step 354, the source node may transmit one or more probe packets initially or periodically to determine an initial flight estimate of the network flow. In step 356, the source node may transmit one or more data packets to the destination node via one or more switches. In step 358, it may be determined whether a congestion notification packet has been received indicating that the queue equilibrium at one or more switches has been exceeded by checking one or more congestion points within the switches. If no congestion is detected at any of the switches, control returns to step 358.

If congestion is detected at one or more switches, control passes to step 362. In step 362, the source node may be enabled to transmit one or more probe packets comprising a departure timestamp, Ts, to a destination node based on receiving the one or more congestion notification frames. In step 364, the probe packet may arrive at the destination node. In step 366, the received timestamp may be updated and the destination node may be enabled to insert an arrival timestamp, Ta, into the received probe packet. In step 368, a probe response packet may be returned to the source node.

In step 370, the arrival rate Ra of one or more data packets at the destination node may be calculated based on the arrival timestamp, Ta. For example, the arrival rate (Ra) may be calculated according to the following equation:

$$Ra=(B_{new}-B_{old})/(Ta_{new}-Ta_{old}),$$

where $B_{new}$ is the number of bytes of the one or more data packets transmitted in the network flow since arrival of a previous probe packet, $B_{old}$ is the number of bytes of one or more data packets transmitted in the network flow up to the transmission of one or more probe packets, $Ta_{new}$ is the arrival timestamp of the transmitted one or more probe packets and $Ta_{old}$ is the arrival timestamp of the previous probe packet. Similarly, the arrival rate (Ra) may also be calculated according to the following equation:

$$Ra=(Tput \times SID_{diff})/(Ta_{new}-Ta_{old}),$$

where Tput is equal to a throughput of transmitting one or more data packets at the source node between the previous probe packet and the transmitted one or more probe packets, and $SID_{diff}$ is a difference in sequence identification (SID) of the previous probe packet and SID of the transmitted one or more probe packets. In step 372, the sending rate (Rs) of the one or more data packets at the source node may be calculated according to the following equation:

$$Rs=(B_{new}-B_{old})/(Ts_{new}-Ts_{old}),$$

where $Ts_{new}$ is the departure timestamp of the transmitted one or more probe packets and $Ts_{old}$ is the departure timestamp of the previous probe packet.

In step 374, it may be determined whether the sending rate Rs is greater than the arrival rate Ra. If the sending Rs is greater than the arrival rate Ra, control passes to step 376. In step 376, the rate limit (R) at the source node may be calculated according to the following equation:

$$R=\min\{(R\times(1+Gd\times Fb)),Ra\},$$

where Gd is a multiplicative decrease gain and Fb is a calculated feedback. In accordance with another embodiment of the invention, the rate limit (R) at the source node may also be calculated according to the following equation:

$$R=2*Ra-Rs.$$

If the sending Rs is not greater than the arrival rate Ra, control passes to step 378. In step 378, the rate limit (R) at the source node may be calculated according to the following equation:

$$R=\max\{R,(Rs\times(1+Gd\times Fb))\}.$$

In accordance with another embodiment of the invention, the rate limit (R) at the source node may also be calculated according to the following equation:

$$R=\max(R,Rs\times A), \text{ where } A>1.$$

In step 380, it may be determined whether the rate limit (R) has been decreasing for N sample periods or the sending rate Rs has been more than the rate limit (R) for N sample periods. If the rate limit (R) has been decreasing for N sample periods or the sending rate Rs has been more than the rate limit (R) for N sample periods, control returns to step 356. If the rate limit (R) has not been decreasing for N sample periods or the sending rate Rs has been less than the rate limit (R) for N sample periods, control passes to step 382. In step 382, the rate limiting at the source node may be terminated.

In accordance with an embodiment of the invention, a method and system for Ethernet congestion management may comprise a source node, node 1 302 that may be enabled to transmit one or more probe packets 301 comprising a departure timestamp Ts from the source node, node 1 302 to a destination node, node 3 306 based on receiving one or more congestion notification frames. The arrival rate Ra of one or more data packets at the destination node, node 3 306 may be calculated based on an arrival timestamp Ta inserted into one or more probe packets 301 at the destination node, node 3 306. The rate limiter at the source node, node 1 302 may be enabled to rate limit one or more data packets based on the calculated arrival rate Ra. The source node, node 1 302 may be enabled to transmit one or more data packets in a network flow to the destination node, node 3 306 via one or more switches, switch 1 308, switch 2 310 and switch 3 312. The source node, node 1 302 may be enabled to receive one or more congestion notification frames from one or more switches, for example, switch 2 310 based on detecting congestion at the congestion point of one or more switches, for example, switch 2 310. The arrival rate (Ra) may be calculated according to the following equation:

$$Ra=(B_{new}-B_{old})/(Ta_{new}-Ta_{old}),$$

where $B_{new}$ is the number of bytes of the one or more data packets transmitted in the network flow since arrival of a previous probe packet, $B_{old}$ is the number of bytes of one or more data packets transmitted in the network flow up to the transmission of one or more probe packets 301, $Ta_{new}$ is the arrival timestamp of the transmitted one or more probe packets 301 and $Ta_{old}$ is the arrival timestamp of the previous probe packet.

The arrival rate (Ra) may also be calculated according to the following equation:

$$Ra=(Tput \times SID_{diff})/(Ta_{new}-Ta_{old}),$$

where Tput is equal to a throughput of transmitting one or more data packets at the source node, node 1 302 between the previous probe packet and the transmitted one or more probe packets 301, and $SID_{diff}$ is a difference in sequence identification (SID) of the previous probe packet and SID of the transmitted one or more probe packets 301. The sending rate (Rs) of the one or more data packets at the source node, node 1 302 may be calculated according to the following equation:

$$Rs=(B_{new}-B_{old})/(Ts_{new}-Ts_{old}),$$

where $Ts_{new}$ is the departure timestamp of the transmitted one or more probe packets 301 and $Ts_{old}$ is the departure timestamp of the previous probe packet. If the sending rate Rs is greater than the arrival rate Ra, the rate limit (R) of the rate limiting at the source node, node 1 302 may be calculated according to one of the following equations:

$$R=\min\{(R \times (1+Gd \times Fb)), Ra\}, \text{ or}$$

$$R=\min\{(R \times (1+Gd \times Fb)), Ra-\text{drain}\},$$

where Gd is a multiplicative decrease gain, drain is a suitably chosen value and Fb is a calculated feedback. In accordance with another embodiment of the invention, if the sending rate Rs is greater than the arrival rate Ra, the rate limit (R) of the rate limiting at the source node, node 1 302 may be calculated according to the following equation:

$$R=2*Ra-Rs.$$

If the sending rate Rs is less than the arrival rate Ra, the rate limit (R) of the rate limiting at the source node, node 1 302 may be calculated according to the following equation:

$$R=\max\{R, (Rs \times (1+Gd \times Fb))\}.$$

In accordance with another embodiment of the invention, if the sending rate Rs is less than the arrival rate Ra, the rate limit (R) of the rate limiting at the source node, node 1 302 may be calculated according to the following equation:

$$R=\max(R, Rs \times A), \text{ where } A>1.$$

The rate limiting at the source node, node 1 302 may be terminated when the rate limit (R) has not decreased for a particular number of sample periods. The rate limiting at the source node, node 1 302 may also be terminated when the sending rate Rs is less than the rate limit (R) for a particular number of sample periods.

The probe packets 301 may be transmitted in the network flow initially to determine an initial estimate of flight time of the network flow. The probe packets 301 may be transmitted in the network flow either before transmitting one or more data packets in the network flow or periodically after a particular number of data packets are transmitted in the network flow.

Another embodiment of the invention may provide a machine-readable storage, having stored thereon, a computer program having at least one code section executable by a machine, thereby causing the machine to perform the steps as described herein for Ethernet congestion management.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing data, the method comprising:
   transmitting a probe from a source node to a destination node in response to said source node receiving one or more congestion notification frames from said destination node, said probe comprising a departure timestamp that indicates a departure time of said probe;
   calculating, at said source node, a destination packet arrival rate at said destination node based on an arrival timestamp inserted into another probe by said destination node;
   comparing, at said source node, a sending rate (Rs) of one or more data packets at said source node and said destination packet arrival rate at said destination node; and
   rate limiting, at said source node, said sending rate of said one or more data packets at said source node based on said comparing of said sending rate at said source node and said destination packet arrival rate at said destination node, wherein
   said comparing at said source node is performed over a number of sample periods, and said sending rate Rs at said source node is calculated according to a following equation:

$$Rs=(B_{new}-B_{old})/(Ts_{new}-Ts_{old}),$$

where $B_{new}$ is a number of bytes transmitted in a network flow since arrival of a previous probe, $B_{old}$ is a number of bytes transmitted in said network flow up to transmitting said probe, $Ts_{new}$ is said departure timestamp and $Ts_{old}$ is a departure timestamp of a previous probe.

2. The method according to claim 1, further comprising transmitting said one or more data packets in a network flow from said source node to said destination node via one or more switches.

3. The method according to claim 2, further comprising receiving said one or more congestion notification frames from said one or more switches based on detecting congestion at said one or more switches.

4. The method according to claim 1, wherein said destination packet arrival rate (Ra) is calculated according to a following equation:

$$Ra=(B_{new}-B_{old})/(Ta_{new}-Ta_{old}),$$

where $Ta_{new}$ is said arrival timestamp, and $Ta_{old}$ is an arrival timestamp of said previous probe.

5. The method according to claim 1, wherein said destination packet arrival rate (Ra) is calculated according to a following equation:

$$Ra=(Tput \times SID_{diff})/(Ta_{new}-Ta_{old}),$$

where Tput is equal to a throughput of transmitting said one or more data packets at said source node between said probe and a previous probe, $SID_{diff}$ is a difference in a sequence identification (SID) of said probe and an SID of said previous probe, $Ta_{new}$ is said arrival timestamp and $Ta_{old}$ is an arrival timestamp of said previous probe.

6. The method according to claim 1, further comprising, when said sending rate Rs is greater than said destination packet arrival rate (Ra), calculating a rate limit (R) of said rate limiting at said source node according to a following equation:

$$R=\min\{(R\times(1+Gd\times Fb)),Ra\},$$

where Gd is a multiplicative decrease gain and Fb is a calculated feedback.

7. The method according to claim 1, further comprising when said sending rate Rs is greater than said destination packet arrival rate (Ra), calculating a rate limit (R) of said rate limiting at said source node according to a following equation:

$$R=2\times Ra-Rs.$$

8. The method according to claim 1, further comprising when said sending rate Rs is less than said destination packet arrival rate (Ra), calculating a rate limit (R) of said rate limiting at said source node according to a following equation:

$$R=\max\{R,(Rs\times(1+Gd\times Fb))\},$$

where Gd is a multiplicative decrease gain and Fb is a calculated feedback.

9. The method according to claim 1, further comprising when said sending rate Rs is less than said destination packet arrival rate (Ra), calculating a rate limit (R) of said rate limiting at said source node according to a following equation:

$$R=\max(R,Rs\times A), \text{ where } A>1.$$

10. The method according to claim 1, further comprising terminating said rate limiting at said source node when a rate limit (R) has not decreased for a particular number of sample periods.

11. The method according to claim 1, further comprising terminating said rate limiting at said source node when said sending rate at said source node is less than a rate limit (R) for a particular number of sample periods.

12. The method according to claim 1, further comprising transmitting said probe in a network flow to determine an initial estimate of flight time of said network flow.

13. The method according to claim 12, wherein said probe is transmitted in said network flow before transmitting said one or more data packets in said network flow.

14. The method according to claim 12, wherein said probe is transmitted in said network flow periodically after a particular number of data packets are transmitted in said network flow.

15. A system for processing data, the system comprising:
a processor at a source node, the processor configured to
transmit a probe packet from the source node to a destination node in response to said source node receiving one or more congestion notification frames from said destination node, said probe packet comprising a departure timestamp that indicates a departure time of said probe;
calculate a destination packet arrival rate at said destination node based on an arrival timestamp inserted into another probe packet by said destination node;
compare a sending rate (Rs) of one or more data packets at said source node and said destination packet arrival rate at said destination node; and
rate limit said sending rate of said one or more data packets at said source node based on said compared sending rate at said source node and said destination packet arrival rate at said destination node, wherein
said processor is configured to perform the comparing over a number of sample periods, and
said processor calculates the sending rate Rs at said source node according to a following equation:

$$Rs=(B_{new}-B_{old})/(Ts_{new}-Ts_{old}),$$

where $B_{new}$ is a number of bytes transmitted in a network flow since arrival of a previous probe packet, $B_{old}$ is a number of bytes transmitted in said network flow up to transmitting said one or more probe packets, $Ts_{new}$ is said departure timestamp of said one or more probe packets and $Ts_{old}$ is a departure timestamp of a previous probe packet.

16. The system according to claim 15, wherein said processor transmits said one or more data packets in a network flow from said source node to said destination node via one or more switches.

17. The system according to claim 16, wherein said processor receives said one or more congestion notification frames from said one or more switches based on detecting congestion at said one or more switches.

18. The system according to claim 15, wherein said destination packet arrival rate (Ra) is calculated according to a following equation:

$$Ra=(B_{new}-B_{old})/(Ta_{new}-Ta_{old}),$$

where $Ta_{new}$ is said arrival timestamp, and $Ta_{old}$ is an arrival timestamp of said previous probe packet.

19. The system according to claim 15, wherein said destination packet arrival rate (Ra) is calculated according to a following equation:

$$Ra=(Tput \times SID_{diff})/(Ta_{new}-Ta_{old}),$$

where Tput is equal to a throughput of transmitting said one or more data packets at said source node between said one or more probe packets and a previous probe packet, $SID_{diff}$ is a difference in a sequence identification (SID) of at least one of said one or more probe packets and an SID of said previous probe packet, $Ta_{new}$ is said arrival timestamp and $Ta_{old}$ is an arrival timestamp of said previous probe packet.

20. The system according to claim 15, wherein when said sending rate Rs is greater than said destination packet arrival rate (Ra), said processor calculates a rate limit (R) of said rate limiting at said source node according to a following equation:

$$R=\min\{(R\times(1+Gd\times Fb)),Ra\},$$

where Gd is a multiplicative decrease gain and Fb is a calculated feedback.

21. The system according to claim 15, wherein when said sending rate Rs is greater than said destination packet arrival rate (Ra), said processor calculates a rate limit (R) of said rate limiting at said source node according to a following equation:

$$R=2\times Ra-Rs.$$

22. The system according to claim 15, wherein when said sending rate Rs is greater than said destination packet arrival rate (Ra), said processor calculates a rate limit (R) of said rate limiting at said source node according to a following equation:

$$R=\max\{R,(Rs\times(1+Gd\times Fb))\},$$

where Gd is a multiplicative decrease gain and Fb is a calculated feedback.

23. The system according to claim 15, wherein when said sending rate Rs is greater than said destination packet arrival rate (Ra), said processor calculates a rate limit (R) of said rate limiting at said source node according to a following equation:

$$R=\max(R,Rs\times A),$$

where A>1.

24. The system according to claim 15, wherein
when said sending rate Rs is greater than said destination packet arrival rate (Ra), said processor calculates a rate limit (R) of said rate limiting at said source node, and
when said rate limit R has not decreased for a particular number of sample periods, said processor terminates said rate limiting at said source node.

25. The system according to claim 15, wherein
when said sending rate Rs is greater than said destination packet arrival rate (Ra), said processor calculates a rate limit (R) of said rate limiting at said source node, and
when said sending rate Rs is less than said rate limit R for a particular number of sample periods, said processor terminates said rate limiting at said source node.

26. The system according to claim 15, wherein said processor transmits said one or more probe packets in a network flow to determine an initial estimate of flight time of said network flow.

27. The system according to claim 26, wherein said one or more probe packets are transmitted in said network flow before transmitting one or more data packets in said network flow.

28. The system according to claim 26, wherein said one or more probe packets are transmitted in said network flow after a particular number of data packets are transmitted in said network flow.

29. A method for processing data, the method comprising:
transmitting a probe from a source node to a destination node in response to said source node receiving one or more congestion notification frames from said destination node, said probe comprising a departure timestamp that indicates a departure time of said probe;
calculating, at said source node, a destination packet arrival rate (Ra) at said destination node based on an arrival timestamp inserted into another probe by said destination node;
comparing, at said source node, a sending rate of one or more data packets at said source node and said destination packet arrival rate at said destination node; and
rate limiting, at said source node, said sending rate of said one or more data packets at said source node based on said comparing of said sending rate at said source node and said destination packet arrival rate at said destination node, wherein
said comparing at said source node is performed over a number of sample periods, and
said destination packet arrival rate Ra is calculated according to a following equation:

$$Ra=(Tput\times SID_{diff})/(Ta_{new}-Ta_{old}),$$

where Tput is equal to a throughput of transmitting said one or more data packets at said source node between said probe and a previous probe, $SID_{diff}$ is a difference in a sequence identification (SID) of said probe and an SID of said previous probe, $Ta_{new}$ is said arrival timestamp and $Ta_{old}$ is an arrival timestamp of said previous probe.

30. A system for processing data, the system comprising:
a processor at a source node, the processor configured to
transmit a probe packet from the source node to a destination node in response to said source node receiving one or more congestion notification frames from said destination node, said probe packet comprising a departure timestamp that indicates a departure time of said probe;
calculate a destination packet arrival rate (Ra) at said destination node based on an arrival timestamp inserted into another probe packet by said destination node;
compare a sending rate of one or more data packets at said source node and said destination packet arrival rate at said destination node; and
rate limit said sending rate of said one or more data packets at said source node based on said compared sending rate at said source node and said destination packet arrival rate at said destination node, wherein
said processor performs the comparing over a number of sample periods, and
said processor calculates said destination packet arrival rate Ra according to a following equation:

$$Ra=(Tput\times SID_{diff})/(Ta_{new}-Ta_{old}),$$

where Tput is equal to a throughput of transmitting said one or more data packets at said source node between said one or more probe packets and a previous probe packet, $SID_{diff}$ is a difference in a sequence identification (SID) of at least one of said one or more probe packets and an SID of said previous probe packet, $Ta_{new}$ is said arrival timestamp and $Ta_{old}$ is an arrival timestamp of said previous probe packet.

31. The system according to claim 30, wherein
when said sending rate Rs is greater than said destination packet arrival rate (Ra), said processor calculates a rate limit (R) of said rate limiting at said source node according to a following equation:

$$R=2\times Ra-Rs.$$

32. The system according to claim 30, wherein
when said sending rate Rs is greater than said destination packet arrival rate (Ra), said processor calculates a rate limit (R) of said rate limiting at said source node, and
when said rate limit R has not decreased for a particular number of sample periods, said processor terminates said rate limiting at said source node.

33. The system according to claim 30, wherein
when said sending rate Rs is greater than said destination packet arrival rate (Ra), said processor calculates a rate limit (R) of said rate limiting at said source node, and
when said sending rate Rs is less than said rate limit R for a particular number of sample periods, said processor terminates said rate limiting at said source node.

* * * * *